United States Patent [19]

Hansen et al.

[11] Patent Number: 4,929,720

[45] Date of Patent: May 29, 1990

[54] ISOTHIAZOLEAZO HYDROXYPYRIDONE DYES

[75] Inventors: Guenter Hansen; Ernst Schefczik, both of Ludwigshafen; Helmut Reichelt, Neustadt, all of Fed. Rep. of Germany

[73] Assignee: Basf Aktiengesellschaft, Ludwigshafen, Fed. Rep. of Germany

[21] Appl. No.: 269,686

[22] Filed: Nov. 10, 1988

[30] Foreign Application Priority Data

Nov. 12, 1987 [DE] Fed. Rep. of Germany ....... 3738372

[51] Int. Cl.[5] .................... C09B 29/039; C09B 29/42; C09B 29/042; D06P 3/54
[52] U.S. Cl. .................... 534/766; 534/765; 534/581; 534/582; 534/573
[58] Field of Search ................. 534/765, 766

[56] References Cited

U.S. PATENT DOCUMENTS

| | | | |
|---|---|---|---|
| 3,998,802 | 12/1976 | Dehnert et al. | 534/766 |
| 4,017,477 | 4/1977 | Hegar et al. | 534/766 X |
| 4,496,480 | 1/1985 | Bergmann et al. | 534/765 X |
| 4,650,860 | 3/1987 | Dehnert et al. | 534/766 |
| 4,774,324 | 9/1988 | Loeffler et al. | 534/766 |

FOREIGN PATENT DOCUMENTS

| | | | |
|---|---|---|---|
| 3400364 | 7/1985 | Fed. Rep. of Germany | 534/765 |
| 3433958 | 3/1986 | Fed. Rep. of Germany | 534/766 |
| 2001665 | 2/1979 | United Kingdom | 534/766 |

*Primary Examiner*—Floyd D. Nigel
*Assistant Examiner*—Fiona T. Powers
*Attorney, Agent, or Firm*—Oblon, Spivak, McClelland, Maier & Neustadt

[57] ABSTRACT

Isothiazole dyes of the formula

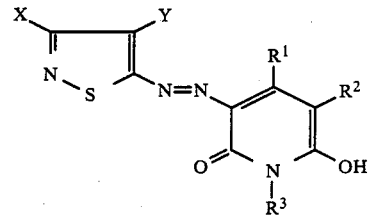

where
X is substituted or unsubstituted $C_1$–$C_8$-alkyl or substituted or unsubstituted phenyl,
Y is hydrogen, cyano, chlorine or bromine,
$R^1$ is hydrogen, $C_1$–$C_4$-alkyl or phenyl,
$R^2$ is hydrogen, cyano, carbamoyl, $C_1$–$C_4$-monoalkyl- or -dialkyl-carbamoyl, $C_1$–$C_6$-alkanoyl, $C_1$–$C_6$-alkoxycarbonyl or 2-($C_1$–$C_4$-alkoxy)-ethoxycarbonyl and
$R^3$ is hydrogen, $C_1$–$C_8$-alkyl which may be substituted and/or interrupted by one or two oxygen atoms, or is $C_5$–$C_7$-cycloalkyl, $C_3$–$C_6$-alkenyl or phenyl, are useful for dyeing synthetic fibers.

4 Claims, No Drawings

ISOTHIAZOLEAZO HYDROXYPYRIDONE DYES

The present invention relates to novel isothiazoleazo dyes incorporating a 5-aminoisothiazole derivative as diazo component and a 6-hydroxypyrid-2-one derivative as coupling component, and to the use thereof for dyeing synthetic fibers.

DE-A-3,433,958 has already disclosed isothiazoleazo dyes incorporating 3-methyl-4-nitro-5-aminoisothiazole as diazo component.

It is an object of the present invention to provide novel nitro-free isothiazoleazo dyes having advantageous application properties.

We have found that this object is achieved with isothiazoleazo dyes of the formula I

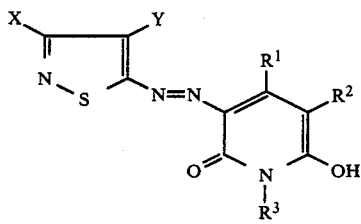

where
X is substituted or unsubstituted $C_1$–$C_8$-alkyl or substituted or unsubstituted phenyl,
Y is hydrogen, cyano, chlorine or bromine,
$R^1$ is hydrogen, $C_1$–$C_4$-alkyl or phenyl,
$R^2$ is hydrogen, cyano, carbamoyl, $C_1$–$C_4$-monoalkyl- or -dialkyl-carbamoyl, $C_1$–$C_6$-alkanoyl, $C_1$–$C_6$-alkoxycarbonyl or 2-($C_1$–$C_4$-alkoxy) ethoxycarbonyl and
$R^3$ is hydrogen, $C_1$–$C_8$-alkyl which may be substituted and/or interrupted by one or two oxygen atoms, or is $C_5$–$C_7$-cycloalkyl, $C_3$–$C_6$-alkenyl or phenyl.

All the alkyl groups appearing in the abovementioned radicals can be not only straight-chain but also branched.

If X is substituted $C_1$–$C_8$-alkyl, suitable substituents are for example chlorine, bromine, cyano, hydroxyl, $C_1$–$C_4$-alkoxy, phenoxy, $C_1$–$C_4$-alkoxycarbonyl or unsubstituted or substituted $C_1$–$C_4$-alkyl-, $C_1$–$C_4$-alkoxy-, chlorine-, bromine- or cyano-substituted phenyl.

If X is substituted phenyl, suitable substituents are for example $C_1$–$C_4$-alkyl, hydroxyl, $C_1$–$C_4$-alkoxy, phenoxy, chlorine, bromine, $C_1$–$C_4$-alkoxycarbonyl, cyano or $C_1$–$C_4$-dialkylaminosulphonyl.

If $R^3$ is substituted $C_1$–$C_8$-alkyl which may be interrupted by one or two oxygen atoms, suitable substituents are for example phenyl, cyano, $C_1$–$C_8$-alkoxycarbonyl, phenoxycarbonyl, halogen, in particular chlorine or bromine, hydroxyl, $C_1$–$C_8$-alkanoyloxy, benzoyloxy, $C_5$–$C_7$-cycloalkoxy or phenoxy.

X, $R^1$ and $R^3$ are each for example methyl, ethyl, propyl, isopropyl, butyl, isobutyl, sec-butyl or tertbutyl.

X and $R^3$ are each further for example pentyl, isopentyl, neopentyl, tert-pentyl, hexyl, heptyl, octyl or 2-ethylhexyl.

X is further for example 2-chloroethyl, 2-bromoethyl, cyanomethyl, 2-cyanoethyl, 2-hydroxyethyl, 2- or 3-hydroxypropyl, 2-methoxyethyl, 2-ethoxyethyl, 2-propoxyethyl, 2-butoxyethyl, 2-phenoxyethyl, methoxycarbonylmethyl, ethoxycarbonylmethyl, 2-methoxycarbonylethyl, 2-ethoxycarbonylethyl, benzyl, 1- or 2-phenylethyl, o-, m- or p-methylbenzyl, o-, m- or p-bromobenzyl, o-, m- or p-chlorobenzyl, o-, m- or p-methoxybenzyl, o-, m- or p-ethoxybenzyl, o-, m- or p-cyanobenzyl, phenyl, o-, m- or p-methylphenyl, o-, m- or p-methoxyphenyl, o-, m- or p-ethoxyphenyl, o-, m- or p-chlorophenyl, o-, m- or p-bromophenyl, o-, m- or p-hydroxyphenyl, p-phenoxyphenyl, o-, m- or p-cyanophenyl, p-dimethylaminosulfonylphenyl or p-diethylaminosulfonylphenyl.

Further specific examples of $R^3$ are 2-methoxyethyl, 2-ethoxyethyl, 2-propoxyethyl, 2-butoxyethyl, 2-methoxypropyl, 3-methoxypropyl, 3-ethoxypropyl, 2-methoxybutyl, 4-methoxybutyl, 2-ethoxybutyl, 4-ethoxybutyl, 3,6-dioxaheptyl, 3,6-dioxaoctyl, benzyl, 1- or 2-phenylethyl, 8-phenyl-4,7-dioxaoctyl, 2-cyanoethyl, 3-cyanopropyl, 4-cyanobutyl, 5-cyano-3-oxapentyl, 6-cyano-4-oxahexyl, 8-cyano-4-oxahexyl, 2-hydroxyethyl, 2- or 3-hydroxypropyl, 2,3-dihydroxypropyl, 2-hydroxybutyl, 4-hydroxybutyl, 5-hydroxy-3-oxapentyl, 6-hydroxy-4-oxahexyl, 8-hydroxy-4-oxaoctyl, 8-hydroxy-3,6dioxaoctyl, 2-phenyl-2-hydroxyethyl, 2-chloroethyl, 2-bromoethyl, 2-phenoxyethyl, 3-phenoxypropyl, 4-phenoxybutyl, 5-phenoxy-3-oxapentyl, 6-phenoxy-4-oxahexyl, 8-phenoxy-4-oxaoctyl, 2-cyclohexyloxyethyl, 3-cyclohexyloxypropyl, 4-cyclohexyloxybutyl, 5-cyclohexyloxy-3-oxapentyl, 6-cyclohexyloxy-4-oxahexyl, 8-cyclohexyloxy-4-oxaoctyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, 5-methoxycarbonyl-3-oxapentyl, 6-methoxycarbonyl-4-oxahexyl, 8-methoxycarbonyl-4oxaoctyl, 2-phenoxycarbonylethyl, 2- or 3-phenoxycarbonylpropyl, 4-phenoxycarbonylbutyl, 5-phenoxycarbonyl-3-oxapentyl, 6-phenoxycarbonyl-4-oxahexyl, 8-phenoxycarbonyl-4-oxaoctyl, 2-formyloxyethyl, 2-acetyloxyethyl, 2-propionyloxyethyl, 2-butyryloxyethyl, 2-(2-ethylhexanoyloxy)ethyl, 2- or 3-acetyloxypropyl, 2- or 3-propionyloxypropyl, 2- or 3-(2-ethylhexanoyloxy)propyl, 4-acetyloxybutyl, 4-propionyloxybutyl, 4-(2-ethylhexanoyloxy)butyl, 5-acetyl-oxy-3-oxapentyl, 5-propionyloxy-3-oxapentyl, 5-(2-ethyl-hexanoyloxy)-3-oxapentyl, 6-acetyloxy-4-oxahexyl, 6-propionyloxy-4-oxahexyl, 6-(2-ethylhexanoyloxy)-4-oxahexyl, 8-acetyloxy-4-oxaoctyl, 8-propionyloxy-4-oxaoctyl, 8-(2-ethylhexanoyloxy)-4-oxaoctyl, 2-benzoyloxyethyl, 2- or 3-benzoyloxypropyl, 4-benzoyloxybutyl, 5-benzoyloxy-3-oxapentyl, 6-benzoyloxy-4-oxahexyl, 8-benzoyloxy-4-oxaoctyl, cyclopentyl, cyclohexyl, cycloheptyl, phenyl, allyl or methallyl.

$R^2$, besides the possibilities already mentioned, is for example mono- or dimethylcarbamoyl, mono- or diethylcarbamoyl, mono- or dipropylcarbamoyl, mono- or diisopropylcarbamoyl, mono- or dibutylcarbamoyl, N-methyl-N-ethylcarbamoyl, formyl, acetyl, propionyl, butyryl, isobutyryl, pentanoyl, hexanoyl, methoxycarbonyl, ethoxycarbonyl, propoxycarbonyl, isopropoxycarbonyl, butoxycarbonyl, isobutoxycarbonyl, sec-butoxycarbonyl, 2-methoxyethoxycarbonyl, 2-ethoxyethoxycarbonyl, 2-propoxyethoxycarbonyl, 2-isopropoxyethoxycarbonyl, 2-butoxyethoxycarbonyl, 2-iso-2-isobutoxyethoxycarbonyl or 2-sec-butoxyethoxycarbonyl.

Preference is given to isothiazoleazo dyes of the formula I where
X is phenyl or benzyl, which each may be substituted by methyl, methoxy, ethoxy or chlorine, or is $C_1$–$C_4$-alkyl, $R^1$ is methyl, $R^2$ is hydrogen, cyano, carbamoyl or $C_1$–$C_4$-alkoxycarbonyl and Y and $R^3$ are each as defined above.

Of particular importance are dyes of the formula I where

X is phenyl or benzyl, which may each be substituted by methyl, methoxy, ethoxy or chlorine, or is $C_1$–$C_4$-alkyl, $R^1$ is methyl, $R^2$ is cyano, $R^3$ is $C_1$–$C_8$-alkyl which may be substituted and/or interrupted by one or two oxygen atoms or is $C_3$–$C_6$-alkenyl and Y is as defined above.

To prepare the isothiazoleazo dyes of the formula I according to the invention, a conventionally obtainable diazonium compound of amines of the formula II

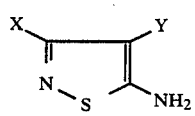   (II)

where X and Y are each as defined above, can be reacted with a 6-hydroxypyrid-2-one derivative of the formula III

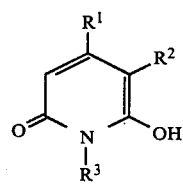   (III)

where $R^1$, $R^2$ and $R^3$ are each as defined above, in a conventional manner. Further details of the preparation may be found in the examples.

The dyes according to the invention are preferably suitable for dyeing synthetic fibers, for example polyesters, polyamides, cellulose esters or polyester/cellulose fiber blend fabrics. They are suitable in particular for dyeing polyester. They produce dyeings in yellow shades and are notable for good light fastness and good affinity. Some of them are also suitable for transfer printing.

The Examples below, where percentages are by weight unless otherwise stated, are intended to illustrate the invention in more detail.

EXAMPLE 1

5.05 g of 5-amino-4-cyano-3-phenylisothiazole were dissolved in 37.5 ml of a 17:3 V/V mixture of glacial acetic acid and propionic acid while heating. 10 ml of 85% strength sulfuric acid were added dropwise at from 10° to 20° C., followed at from 0° to 5° C. by 4.3 ml of nitrosylsulfuric acid (11.5% of $N_2O_3$). This was followed by 4 hours of stirring at from 0° to 5° C.

The above-prepared diazonium salt solution was added dropwise at 0° C. to 6.0 g of 1-butyl-3-cyano-6-hydroxy-4-methylpyrid-2-one in 30 ml of N,N-dimethylformamide, 100 g of ice and 0.5 g of amidosulfuric acid. After 4 hours of stirring at from 0° to 5° C., the reaction mixture was slowly warmed to room temperature and filtered with suction, and the precipitate was washed and dried to leave 7.7 g of the dye of the formula

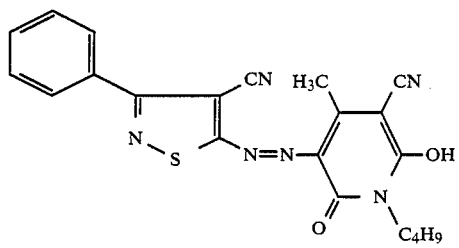

which dyes polyester material in fast yellow shades ($\lambda max$ ($CH_2Cl_2$): 427 nm).

EXAMPLE 2

4.8 g of 5-amino-4-bromo-3-methylisothiazole in 20 ml of water and 10 ml of dilute hydrochloric acid were admixed at 10° C. with 1.7 g of sodium nitrite dissolved in 5 ml of water. After 2 hours of stirring at from 10° to 15° C., 150 g of ice and 0.5 g of amidosulfuric acid were added. A solution of 5.8 g of 3-cyano-6-hydroxy-1,4-dimethylpyrid-2-one in 70 ml of water, whose pH had been adjusted to 9 with sodium carbonate, was then added dropwise at from 0° to 5° C. A workup as in Example 1 left 8.3 g of a mixture of the dyes of the formula

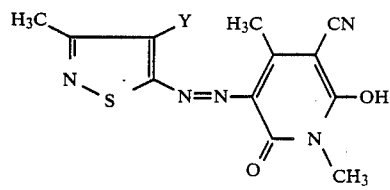

where Y is chlorine and bromine. The dye mixture dyes polyester in fast yellow shades ($\lambda max(CH_2Cl_2)$: 437 nm).

EXAMPLE 3

3.75 g of 5-amino-3-methylisothiazole hydrochloride in 40 ml of water, 10 ml of dilute hydrochloric acid and 25 g of ice were admixed with 1.7 g of sodium nitrite dissolved in 5 ml of water, and the mixture was subsequently stirred at from 0° to 5° C. for 2 hours. The coupling reaction which was carried out as described in Example 2, except that 6.0 g of 1-butyl-3-cyano-6-hydroxy-4-methyl-pyrid-2-one were used as the coupling component, gave after a customary workup 6.9 g of the dye of the formula

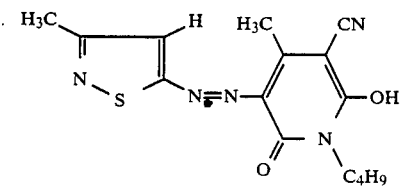

which dyes polyester material in fast yellow shades ($\lambda max(CH_2Cl_2)$: 432 nm.

The same method was used to obtain the dyes listed in the table below, which dye polyester material in yellow shades.

TABLE

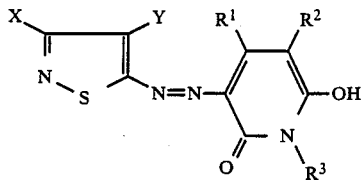

| Ex. No. | X | Y | R¹ | R² | R³ |
|---|---|---|---|---|---|
| 4 | $C_6H_5CH_2$ | CN | $CH_3$ | CN | $CH_3$ |
| 5 | $C_6H_5CH_2$ | CN | $CH_3$ | CN | $C_4H_9$ |
| 6 | p-$CH_3OC_6H_4CH_2$ | CN | $CH_3$ | CN | $C_3H_6O$—⟨H⟩ |
| 7 | p-$CH_3OC_6H_4CH_2$ | CN | $CH_3$ | CN | $C_3H_7$ |
| 8 | p-$CH_3C_6H_4CH_2$ | CN | $CH_3$ | CN | $CH_3$ |
| 9 | p-$CH_3C_6H_4CH_2$ | CN | $CH_3$ | CN | $CH_2CH(C_2H_5)C_4H_9$ |
| 10 | $CH_3$ | CN | $CH_3$ | CN | $C_6H_{13}$ |
| 11 | $CH_3$ | CN | $CH_3$ | CN | $C_3H_6O$—$C_6H_5$ |
| 12 | $CH_3$ | CN | $CH_3$ | CN | $C_2H_5$ |
| 13 | $C_6H_5$ | CN | $CH_3$ | CN | $CH_3$ |
| 14 | $C_6H_5$ | CN | $CH_3$ | CN | $C_3H_7$ |
| 15 | $C_6H_5$ | CN | $CH_3$ | CN | $C_3H_6O$—⟨H⟩ |
| 16 | $CH(CH_3)_2$ | CN | $CH_3$ | CN | $C_3H_6OC_2H_4OC_6H_5$ |
| 17 | $CH(CH_3)_2$ | CN | $CH_3$ | CN | $C_4H_9$ |
| 18 | p-$CH_3OC_6H_4$ | CN | $CH_3$ | CN | $CH_3$ |
| 19 | p-$CH_3C_6H_4$ | CN | $CH_3$ | CN | $C_3H_7$ |
| 20 | $CH_3$ | Br | $CH_3$ | CN | $C_4H_9$ |
| 21 | $CH_3$ | Br | $CH_3$ | CN | $CH_2CH(C_2H_5)C_4H_9$ |
| 22 | $CH_3$ | Cl | $CH_3$ | CN | $CH_3$ |
| 23 | $CH_3$ | Cl | $CH_3$ | CN | $C_6H_{13}$ |
| 24 | $CH_3$ | Cl | $CH_3$ | CN | $C_4H_9$ |
| 25 | $CH_3$ | H | $CH_3$ | CN | $CH_3$ |
| 26 | $CH_3$ | H | $CH_3$ | CN | $C_3H_7$ |
| 27 | $CH_3$ | H | $CH_3$ | CN | $C_3H_6O$—⟨H⟩ |
| 28 | $C_6H_5$ | CN | H | CN | $CH_3$ |
| 29 | $CH_3$ | CN | H | $CONHC_3H_7$ | $C_3H_7$ |
| 30 | $CH_3$ | Br | H | $CONHC_3H_7$ | $C_3H_7$ |
| 31 | $C_6H_5CH_2$ | CN | $CH_3$ | H | $C_2H_5$ |
| 32 | $C_3H_7$ | CN | $CH_3$ | H | $C_2H_5$ |
| 33 | $CH_3$ | Cl | $CH_3$ | H | $C_2H_5$ |
| 34 | $CH_3$ | H | $CH_3$ | H | $C_2H_5$ |
| 35 | p-$CH_3OC_6H_4CH_2$ | CN | $CH_3$ | $CONH_2$ | $CH_3$ |
| 36 | $C_6H_5$ | CN | $CH_3$ | $CONH_2$ | $CH_3$ |
| 37 | p-Cl—$C_6H_4$ | CN | $CH_3$ | $CONH_2$ | $CH_3$ |
| 38 | $CH_3$ | Br | $CH_3$ | $CONH_2$ | $CH_3$ |
| 39 | $CH_3$ | CN | $CH_3$ | $CONH_2$ | $CH_2CH(C_2H_5)C_4H_9$ |
| 40 | $C_6H_5$ | CN | $CH_3$ | $CO_2C_2H_5$ | $C_4H_9$ |
| 41 | $CH_3$ | CN | $CH_3$ | $CO_2C_2H_5$ | $C_4H_9$ |
| 42 | $CH_3$ | Br | $CH_3$ | $CO_2C_2H_5$ | $C_4H_9$ |
| 43 | $CH_3$ | Br | $CH_3$ | CN | H |
| 44 | $C_6H_5CH_2$ | CN | $CH_3$ | CN | H |
| 45 | $C_6H_5$ | CN | $CH_3$ | CN | $CH_2CH=CH_2$ |
| 46 | $CH_3$ | CN | $CH_3$ | CN | $CH(CH_3)_2$ |
| 47 | $CH_3$ | Br | $CH_3$ | CN | $CH(CH_3)_2$ |

We claim:
1. An isothiazoleazo of the formula I:

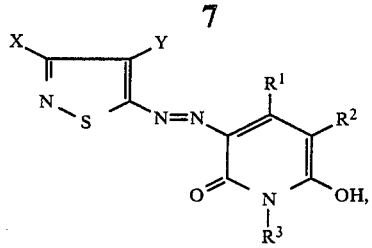

(I)

where
X is a $C_1$-$C_8$-alkyl, a $C_1$-$C_8$-alkyl substituted with chlorine, bromine, cyano, hydroxyl, $C_1$-$C_4$-alkoxy, phenoxy, $C_1$-$C_4$-alkoxycarbonyl, phenyl or phenyl substituted with $C_1$-$C_4$-alkyl, $C_1$-$C_4$-alkoxy, chlorine, bromine or cyano, or X is phenyl or phenyl substituted with $C_1$-$C_4$-alkyl, hydroxyl, $C_1$-$C_4$-alkoxy, phenoxy, chlorine, bromine, $C_1$-$C_4$-alkoxycarbonyl, cyano or $C_1$-$C_4$-dialkylaminosulphonyl, Y is hydrogen, cyano, chlorine or bromine, $R^1$ is hydrogen, $C_1$-$C_4$-alkyl or phenyl, $R^2$ is hydrogen, cyano, carbamoyl, $C_1$-$C_4$-monoalkyl- or -dialkyl-carbamoyl, $C_1$-$C_6$-alkanoyl, $C_1$-$C_6$-alkoxycarbonyl or 2-($C_1$-$C_4$-alkoxy)-ethoxycarbonyl and $R^3$ is hydrogen, $C_1$-$C_8$-alkyl, $C_1$-$C_8$-alkyl substituted with phenyl, cyano, $C_1$-$C_8$-alkoxycarbonyl, phenoxycarbonyl, halogen, hydroxyl, $C_1$-$C_8$-alkanoyloxy, benzoyloxy, $C_5$-$C_7$-cycloalkoxy or phenoxy or $C_1$-$C_8$-alkyl interrupted by one or two oxygen atoms, or is $C_5$-$C_7$-cycloalkyl, $C_3$-$C_6$-alkenyl or phenyl.

2. The isothiazoleazo dye as claimed in claim 1, wherein
X is phenyl or benzyl, or phenyl or benzyl substituted with methyl, methoxy, ethoxy or chlorine, or is $C_1$-$C_4$-alkyl,
$R^1$ is methyl,
$R^2$ is hydrogen, cyano, carbamoyl or $C_1$-$C_4$-alkoxycarbonyl and
Y and $R^3$ are each as defined in claim 1.

3. The isothiazoleazo dye as claimed in claim 1, wherein
X is phenyl or benzyl, or phenyl or benzyl substituted with methyl, methoxy, ethoxy or chlorine, or is $C_1$-$C_4$-alkyl,
$R^1$ is methyl,
$R^2$ is cyano,
$R^3$ is $C_1$-$C_8$-alkyl or $C_1$-$C_8$-alkyl substituted or interrupted by one or two oxygen atoms or is $C_3$-$C_6$-alkenyl and
Y is as defined in claim 1.

4. A method of using an isothiazoleazo dye as claimed in claim 1, for dyeing synthetic fibers.

* * * * *